US006633015B2

(12) United States Patent
Nguyen et al.

(10) Patent No.: US 6,633,015 B2
(45) Date of Patent: Oct. 14, 2003

(54) SOFT-TOUCH PNEUMATIC DRIVE UNIT

(75) Inventors: Tam C. Nguyen, Markham (CA); Eric Michaud, Amherstburg (CA)

(73) Assignee: Doben Limited, Windsor (CA)

( * ) Notice: Subject to any disclaimer, the term of this patent is extended or adjusted under 35 U.S.C. 154(b) by 493 days.

(21) Appl. No.: 09/732,458

(22) Filed: Dec. 8, 2000

(65) Prior Publication Data

US 2003/0047335 A1 Mar. 13, 2003

(51) Int. Cl.[7] .............................................. B23K 11/31
(52) U.S. Cl. ....................................................... 219/89
(58) Field of Search ................. 219/89, 86.61; 91/519

(56) References Cited

U.S. PATENT DOCUMENTS

| | | | |
|---|---|---|---|
| 4,352,971 A | * 10/1982 | Slade ........................ | 219/89 |
| 4,745,845 A | * 5/1988 | Legris et al. | |
| 5,125,325 A | * 6/1992 | Czukkermann | |
| 5,174,191 A | * 12/1992 | Leinweber et al. | |
| 5,191,825 A | * 3/1993 | Beneteau et al. | |
| 5,349,151 A | * 9/1994 | Eisbrenner et al. | |
| 5,623,861 A | * 4/1997 | Ward et al. | |
| 5,789,719 A | * 8/1998 | Pary et al. ................... | 219/89 |

FOREIGN PATENT DOCUMENTS

| | | | |
|---|---|---|---|
| EP | 0060412 | * | 9/1982 |
| EP | 0640429 | * | 11/1994 |
| WO | 92/17311 | * | 10/1992 |
| WO | 97/41993 | * | 11/1997 |

* cited by examiner

Primary Examiner—Clifford C. Shaw
(74) Attorney, Agent, or Firm—Allen D. Gutchess, Jr.

(57) ABSTRACT

A soft-touch pneumatic drive unit for welding is provided. The drive unit includes a first section, a second section, and a third section. A piston rod extends substantially throughout these sections and contains a drive piston in the second section and a second drive piston in the third section. Pressurized fluid is supplied through the first section and into the second section to provide a driving force on these pistons. Cushioning fluid is supplied through the first section to the second section to cushion and slow the piston rod as an electrode carried thereby is moved toward a workpiece. A floating piston in the second section then blocks the flow of cushioning fluid from the first section with fluid pressure in the second section then decreasing to atmospheric pressure to enable full welding force to be applied through the drive pistons and the piston rod to the electrode. The cushioning fluid also aids in returning the piston components to the retracted position upon the completion of a weld.

11 Claims, 4 Drawing Sheets

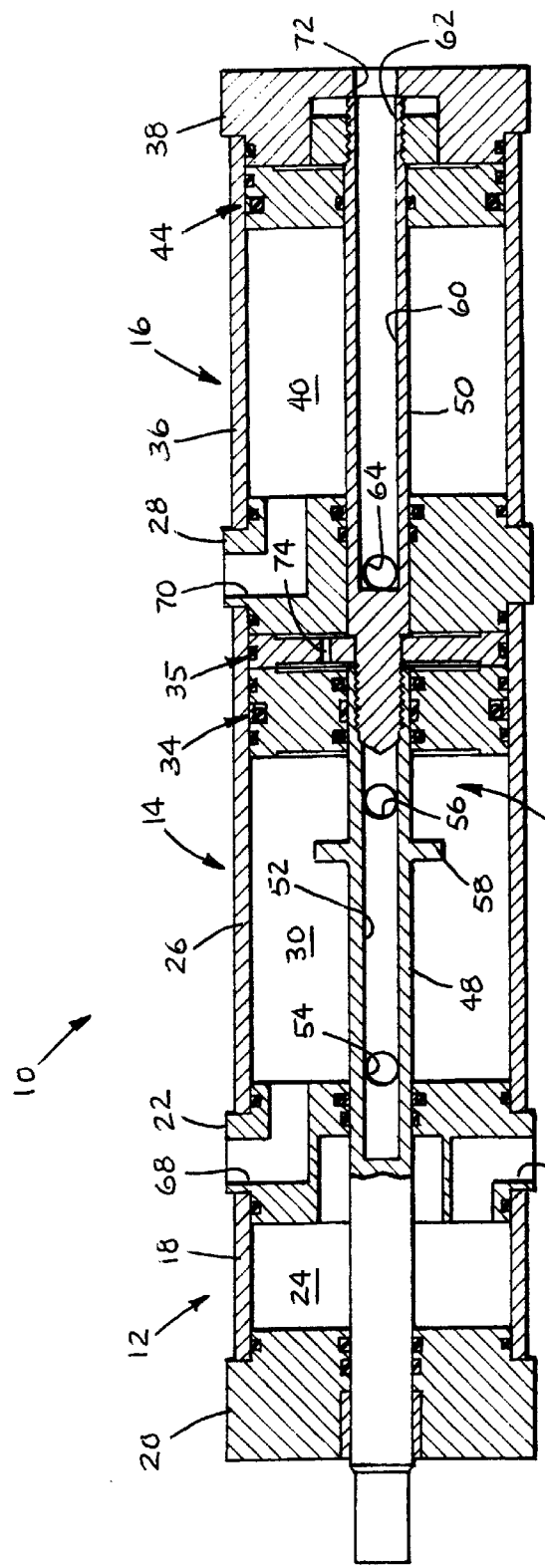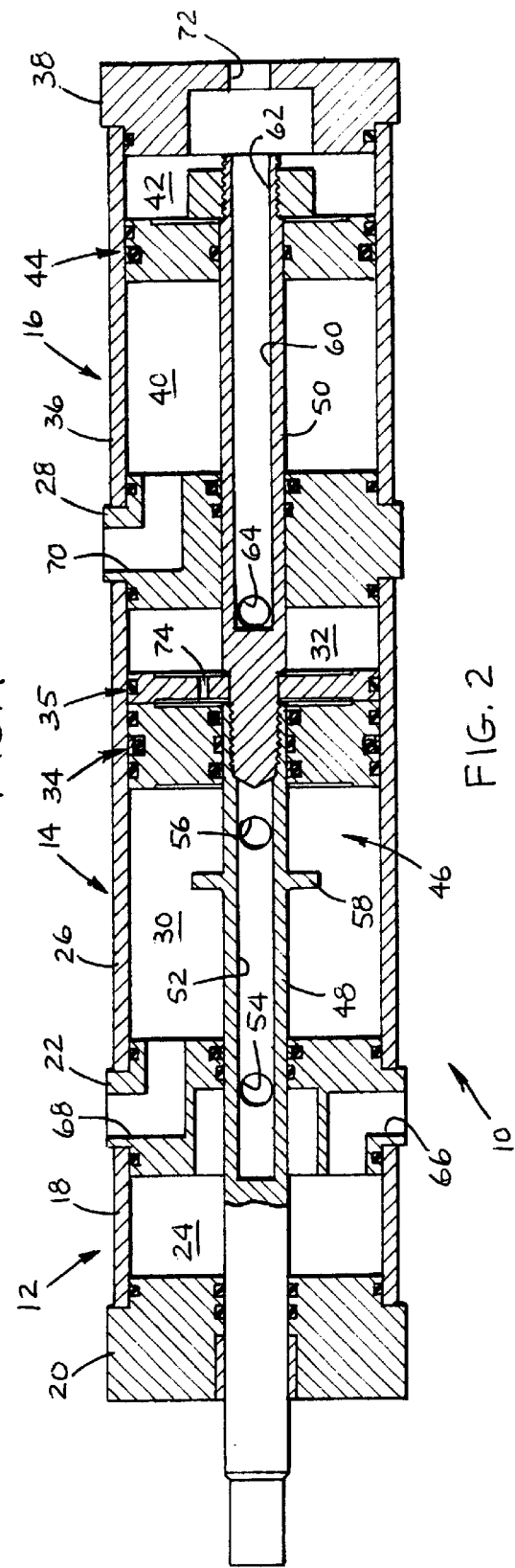

SOFT-TOUCH PNEUMATIC DRIVE UNIT

This invention relates to a fluid-operated drive unit for welding apparatus.

The drive unit employs fluid, specifically air, under pressure to slow the advance stroke of an electrode toward a workpiece to achieve a "soft-touch" by the electrode.

The drive unit includes aligned cylindrical wall means preferably forming three chambers or sections with a piston rod extending through the first two chambers. The piston rod has a first drive piston and a floating piston in the second chamber and a second drive piston in the third chamber. The piston rod extends out of the first, cushioning chamber to an electrode holder. The advance stroke of the electrode is achieved through the drive pistons and the stroke is slowed before the electrode contacts the workpiece to provide a soft-touch engagement of the electrode and the workpiece. To achieve this, cushioning air under pressure is supplied from the first chamber through ports in a passage in the piston rod to a forward portion of the second chamber. This air slows the advance of the floating and front drive pistons. The floating piston then moves over and closes a port of the piston rod passage to shut off cushioning air to the second chamber.

Air is vented from this chamber to lower the pressure to atmospheric and thereby enable full welding pressure of the electrode on the workpiece to be applied by the first and second drive pistons.

To return the piston rod to the retracted position, air is supplied under pressure to the forward portion of the second section which moves the floating piston back to the first drive piston and enables air under pressure again to be supplied to the second section from the cushioning section. This air further aids in the retraction of the piston rod to complete the cycle.

The drive unit uses pressurized air to provide the cushioning effect regardless of the rate of flow of the air either into or out of the cushioning chamber. The design also enables the pressurized air in the cushioning chamber to assist in the retraction of the piston rod and pistons to the retracted position. The design also enables a soft touch to be achieved with a faster cycle time because the design enables a high flow rate of the pressurized air.

It is, therefore, a principal object of the invention to provide a soft-touch pneumatic drive unit for welding apparatus which has the objects and advantages discussed above.

Other objects and advantages of the invention will be apparent from the detailed description of preferred embodiments thereof, reference being made to the accompanying drawings, in which:

FIG. 1 is a somewhat schematic view in cross section of a soft-touch pneumatic drive unit embodying the invention;

FIGS. 2 and 3 are views similar to FIG. 1 with certain components of the drive unit shown in different positions;

Figure 3:
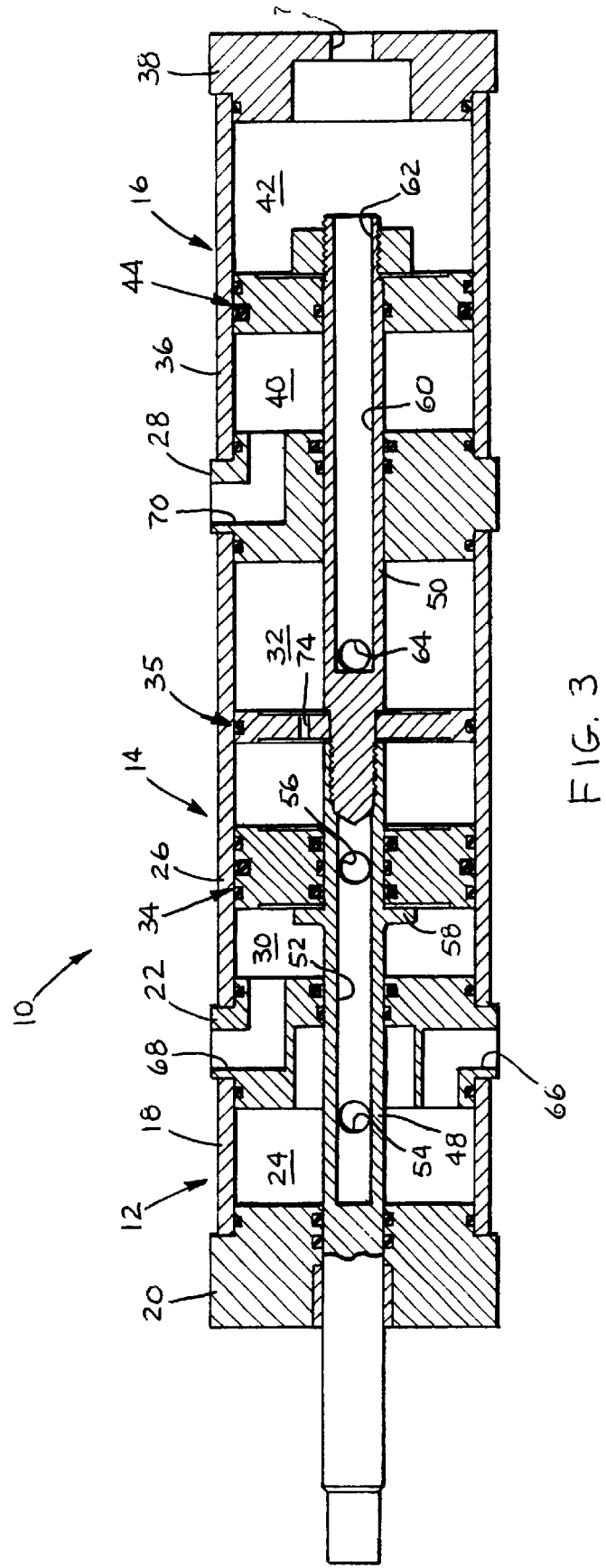

Referring to the drawings, an more particularly to FIG. 1, a soft-touch pneumatic drive unit 10 includes a first section 12, a second section 14, and a third section 16. The first section 12 has a cylindrical wall 18 with a front end cap 20 and a first separator block 22. These form a cushioning chamber 24.

The second section 14 includes a cylindrical wall 25 and the separator block 22 along with a second separator block 28. These form an additional chamber including a return chamber 30 and a first advance chamber 32 (FIGS. 2 and 3), separated by a floating piston 34 and a first, front piston 35, to be discussed subsequently.

The third section 16 has a cylindrical wall 36, the separator block 28, and an end block 38. These define a drive chamber, including a vented chamber 40 and a second advance chamber 42 (FIGS. 2 and 3), separated by a second, back piston 44.

Piston rod means 46 including a first piston rod 48 and a second piston rod 50 extend through the chambers 24, 30, 32, and 40, and into the chamber 42. The first piston rod 48 has a first central or cushioning passage 52 with an entrance port 54 and an exit port 56. The piston rod 48 also has a positive stop 58 formed thereon, and extending outwardly therefrom, located between the ports 54 and 56.

The second piston rod 50 has a second central passage 60 therein with an entrance port 62 at an end thereof and an exit port 64 located near the other end of the passage 60.

The separator block 22 has a cushion port 66 for supplying cushioning fluid to the chamber 24. The separator block 22 also has a return port 68 for supplying retracting fluid to the return chamber 30. The second separator block 28 has a venting port 70 for venting fluid from the chamber 40. Finally, the end block 38 has an advancing fluid port 72 for supplying fluid to the section 16.

The components of the drive unit 10 are shown in their fully returned or retracted position in FIG. 1. In this position, the return chamber 30 is filled with pressurized fluid supplied from the return port 68. This fluid causes the floating piston 34 to be pushed against the front piston 35, which is between the floating piston 34 and the separator block 28. At the same time, the back piston 44 is moved back against the end block 38.

In this position, the entrance and exit ports 54 and 56 of the cushioning passage 52 are totally inside the return chamber 30. The cushioning fluid in the chamber 24, supplied from the port 66, remains under pressure with the port 54 being shut off from the chamber 24 by the piston rod 48. At the same time, the advance chambers 32 and 42 are at minimum volume, the chamber 32 being vented to atmosphere through the port 64, the passage 60, and the end port 62, and the chamber 42 being vented through the port 72.

Fluid flow through the port 64 is restricted near the end of the return stroke and also at the initial stage of the advance stroke of the piston rod means 46 because the port 64 is within the second separator block 28. Fluid is thereby temporarily trapped in the chamber 32 to provide a soft-touch near the end of the return stroke. In addition, the floating piston 34 will not move forwardly until pushed by the front and back pistons 35 and 44 during the advance stroke.

For the advance stroke, pressurized fluid, controlled by pressure regulator, is supplied to the advance port 72. However, the initial pressure increase in the chamber 32 will be smaller than in the chamber 42 since the port 64 in the block 28 is restricting the fluid flow to the chamber 32. There is no seal around the piston rod 50 in the separator block 28 near the chamber 32 to enable restricted flow of fluid between the chamber 32 and the port 64. Thus, as mentioned, this assures that the floating piston 34 will not move forwardly until pushed by the pistons 35 and 44 and the piston rod 50. As the pistons advance, with the volumes of the chambers 32 and 42 increasing, the pressure in the return chamber 30 continues to decrease but at a slightly lower rate because of the reduction in its volume even though the chamber is vented through the port 68. This cushioning pressure in the chamber 30 slows down the piston rods 48 and 50 which results in a lower initial impact force of the electrode carried by the piston rod on the workpiece. The pressurized fluid in the return chamber 30 also tends to remain constant in spite of the venting because the port 54 moves into the cushioning chamber 24 as the piston rods move forwardly, with the result that cushioning fluid in the chamber 24 surges into the chamber 30. Consequently, as the pistons 35 and 44 advance, the fluid pressure in the chamber 30 serves as a cushion for the impact of the electrode on the workpiece.

When the piston rods 48 and 50 stop as the electrode engages the workpiece, pressurized fluid from the chamber 32 passes through a by-pass opening or port 74 in the piston 35 behind the floating piston 34. The piston is moved against the piston rod stop 58 and closes the port 56 to stop the flow of cushioning fluid from the chamber 24 (see FIG. 3). The pressure in the chamber 30 then drops to atmospheric, being vented through the port 68. This enables full welding force to be applied by the electrode to the workpiece through the front and back pistons 35 and 44.

To retract the components to the fully returned position of FIG. 1, both the chambers 32 and 42 are vented through the port 64, the passage 60, the port 62, and the end port 72. Return fluid is supplied through the port 68. Also, the floating piston 34 is pushed back to the front piston 35 which temporarily opens the port 56 so that cushioning air will be supplied from the chamber 24 to the chamber 30. This enables the components to quickly return to the retracted position although fluid is under pressure in the chamber 32 near the end of the return stroke to cause the soft touch of the return. The pistons 35 and 44 bottom out then against the separator block 28 and the end block 38 to complete the cycle.

From the above discussion and description, it will be seen that the design according to the invention does not restrict the flow rate of advance or return air, thereby resulting in acceleration and deceleration of the pistons as quickly as possible. The fast advance is also assured because of the large entrance port 72 for the drive piston 44 and also because of the large passage 60 and the large port 64 for the drive piston 35. For the soft touch effect, rapid transfer of cushioning air under pressure from the cushioning chamber 24 to the return chamber 30 is achieved because of the close position of the chamber 24 to the chamber 30 and also because of the large ports 54 and 56 and the large passage 52. The cushioning air also enables the return stroke to be speeded up to achieve a faster cycle time.

By using the pressurized air in the chamber 24 for soft touch, it is not necessary to restrict the flow of air from the cushioning chamber 30 for this purpose. The cushioning effect is also relatively easily varied by changing the pressure of the cushioning air in the cushioning chamber 24. When the return chamber 30 is vented to atmosphere through the port 68, a steady welding force is achieved. Similar advantages will be seen from another design of the invention.

In the second embodiment of the soft touch pneumatic drive unit, the advance or welding stroke causes the piston rod to move into the cylinder to shorten the protruding length of the piston rod. In this embodiment, the retraction of the piston rod can be stopped at a fixed intermediate stroke position by supplying fluid pressure to a retract portion of the unit that is greater than the fluid in a return chamber. This can also be accomplished by increasing the diameter of the retract piston to accomplish the same result with the same fluid pressure.

Figure 4:
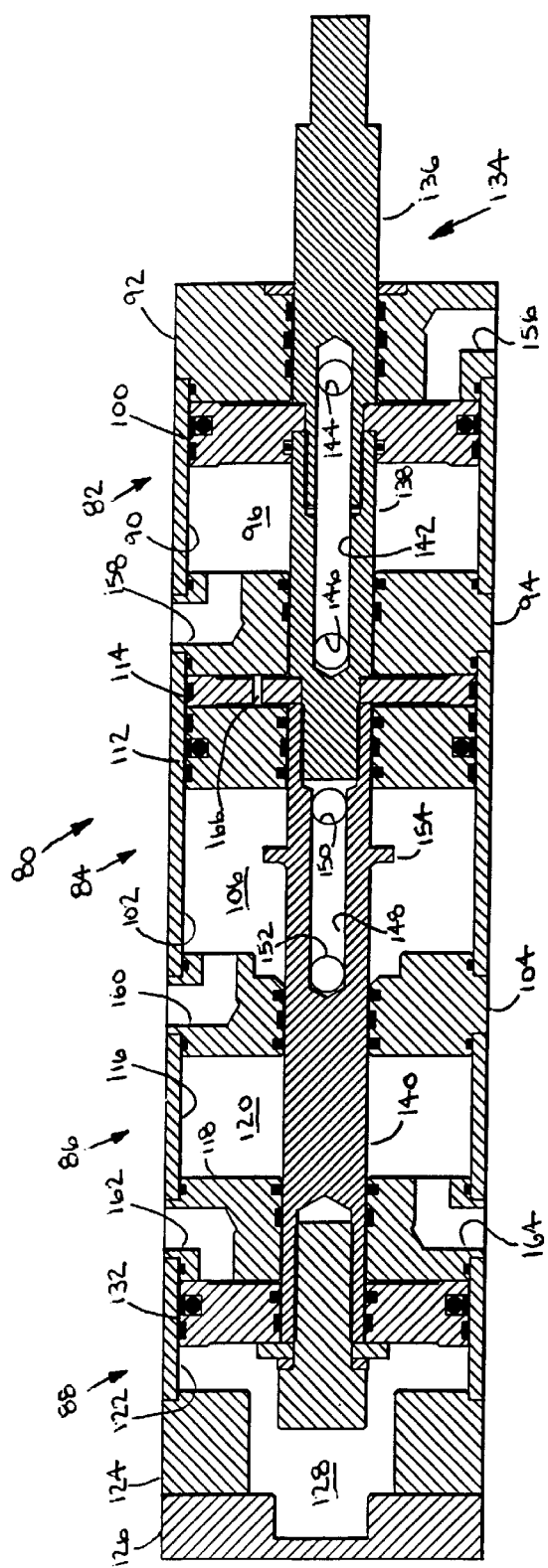
FIG. 4 is a somewhat similar schematic view in cross section of a modified soft-touch pneumatic drive unit embodying the invention.

Referring to the drawings, and more particularly to FIG. 4, a soft-touch drive unit 80 includes a first section 82, a second section 84, a third section 86, and a fourth section 88. The The first section 82 has a cylindrical wall 90 with a front end cap 92 and a first separator block 94. These form a drive chamber including a vented chamber 96 and a first advance chamber 98 separated by a piston rod 100.

The second section 84 includes a cylindrical wall 102 and the separator block 104. These form an additional chamber including a return chamber 106 and a second advance chamber 110 (FIGS. 5, 6) separated by a floating piston 112 and a first, front piston 114, to be discussed subsequently.

The third section 86 has a cylindrical wall 116, the second separator block 104, and a third separator block 118. These define a cushioning chamber 120.

The fourth section 88 includes a cylindrical wall 122 and the third separator block 118 along with an end block 124 and an end cap 126. These form a chamber 128 and a retract chamber 130 (FIGS. 5, 6) separated by a piston 132.

Piston rod means 134 including a first piston rod 136, a second piston rod 138, and a third piston rod 140 extend through the chambers 96, 106, 120, and into the chamber 128. The first piston rod 134 and the second piston rod 138 form a first central or advance passage 142 with an entrance port 144 in the piston 136 and an exit port 146 in the piston 138.

The third piston rod 140 has a second central or cushioning passage 148 with an entrance port 152 and an exit port 150. The piston rod 140 also has a positive stop 154 formed thereon, and extending outwardly therefrom, located between the ports 152 and 150.

The front end block 92 has an advance port 156 for supplying fluid to the advance chamber 98 and through the port 144, passage 142, and port 146 to the chamber 110. The first separator block has a vented port 158 for venting fluid from the chamber 96. The second separator block 104 has a return port 160 for supplying retracting fluid to the return chamber 106. The third separator block 118 has a retract port 162 for supplying fluid to the retract chamber 130 and a cushioning port 164 for supplying fluid to the cushioning chamber 120.

The components of the drive unit 80 are shown in the returned position in FIG. 4. In this position, the return chamber 106 is filled with pressurized fluid supplied from the return port 160. This fluid causes the floating piston 112 to be pushed against the piston 114, which is between the floating piston 112 and the separator block 94. At the same time, the front piston 100 is moved back against the end block 92 and the retract piston 132 is moved against the separator 118.

In this position, the entrance and exit ports 152 and 150 of the cushioning passage 148 are totally inside the chamber 106. The cushioning fluid in the chamber 120, supplied from the port 164 remains under pressure with the port 152 being shut off from the chamber 120 by the piston rod 140. At the same time, the advance chambers 98 and 110 are at minimum volume, the chamber 98 being vented to atmosphere through the port 156 and the chamber 110 being vented through the port 146, the passage 142, and the port 144.

Fluid flow through the port 146 is restricted near the end of the return stroke and also at the initial stage of the advance stroke of the piston rod means 134 because the port 146 is within the first separator block 94. Fluid is thereby temporarily trapped in the chamber 110 to provide a soft-touch near the end of the return stroke. In addition, the floating piston 112 will not move forwardly until pushed by the front and back pistons 100 and 114 during the advance stroke.

Figure 6:
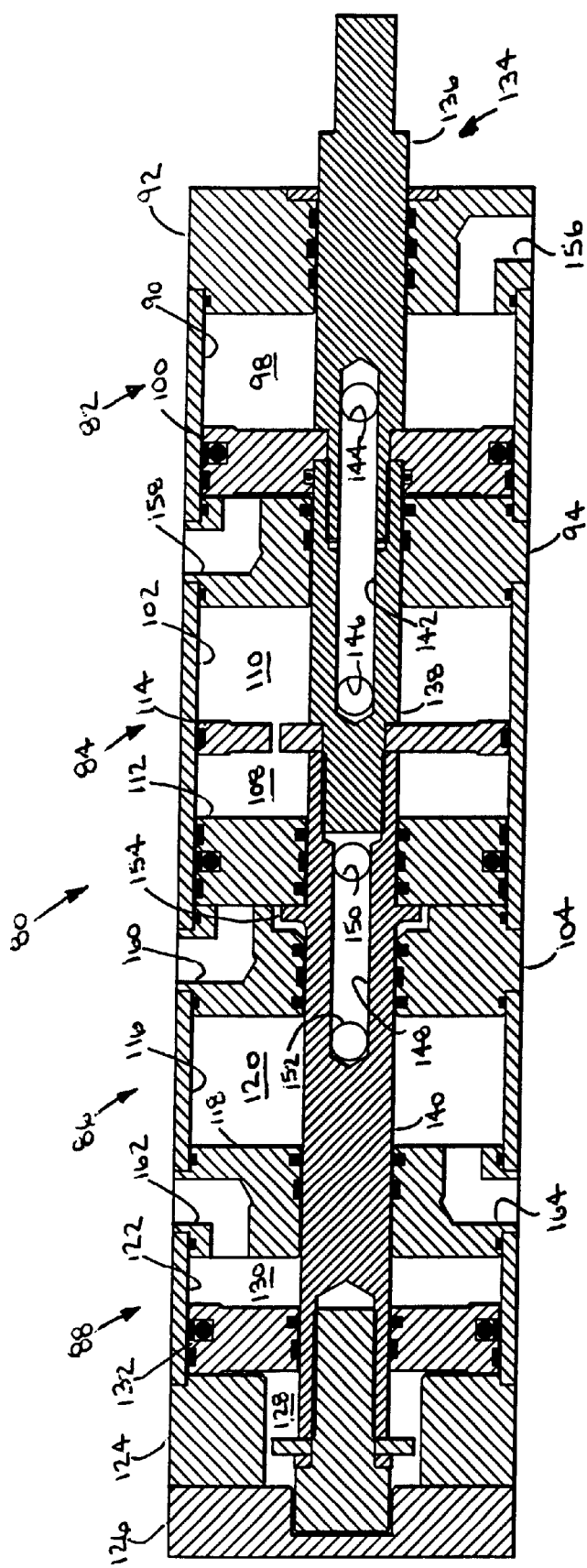

For the advance stroke shown in FIG. 6, pressurized fluid controlled by a pressure regulator, is supplied to the advance port 156. However, the initial pressure increase in the chamber 110 will be smaller than in the chamber 98 since the port 146 is within the block 94 and is restricting the fluid flow to the chamber 110. There is no seal around the piston rod 138 in the separator block 94 near the chamber 110 so a restricted flow of fluid is allowed between the chamber 110 and the port 146. Thus, as mentioned, this assures that the floating piston 112 will not move forwardly until pushed by the pistons 100 and 114 and the piston rod 138. As the pistons advance, with the volumes of the chambers 98 and 110 increasing, the pressure in the return chamber 106 continues to decrease but at a slightly lower rate because of the reduction in its volume even though the chamber is vented through the port 160. This cushioning pressure in the chamber 106 slows down the piston rods 140 and 138 which results in a lower initial impact force of the electrode carried by the piston rod on the workpiece. The pressurized fluid in the return chamber 106 also tends to remain constant in spite of the venting because the port 152 moves into the cushioning chamber 120 as the piston rods move forwardly, with the result that cushioning fluid in the chamber 120 surges into the chamber 106. Consequently, as the pistons 100 and 114 advance, the fluid pressure in the chamber 106 serves as a cushion for the impact of the electrode on the workpiece.

When the piston 134 stops as the electrode engages the workpiece, pressurized fluid from the chamber 106 passes through a by-pass opening or port 166 in the piston 114 behind the floating piston 112. The piston is moved against the piston rod stop 154 and closes the port 150 to stop the flow of cushioning fluid from the chamber 120 (see FIG. 6). The pressure in the chamber 106 then drops to atmospheric, being vented through the port 160. This enables full welding force to be applied by the electrode to the workpiece through the front and back pistons 100 and 114.

To return the components to the fully returned position of FIG. 4, both the chambers 98 and 110 are vented through the port 146, the passage 142, the port 144, and the port 156. Return fluid is supplied through the port 160. Also, the floating piston 112 is pushed back to the piston 114 which temporarily opens the port 150 so that cushioning air will be supplied from the chamber 120 to the chamber 106. This enables the components to quickly return to the retracted position although fluid is under pressure in the chamber 110 near the end of the return stroke to cause the soft touch of the return. The pistons 114 and 100 bottom out then against the separator block 94 and the end block 92 to complete the cycle.

Figure 5:
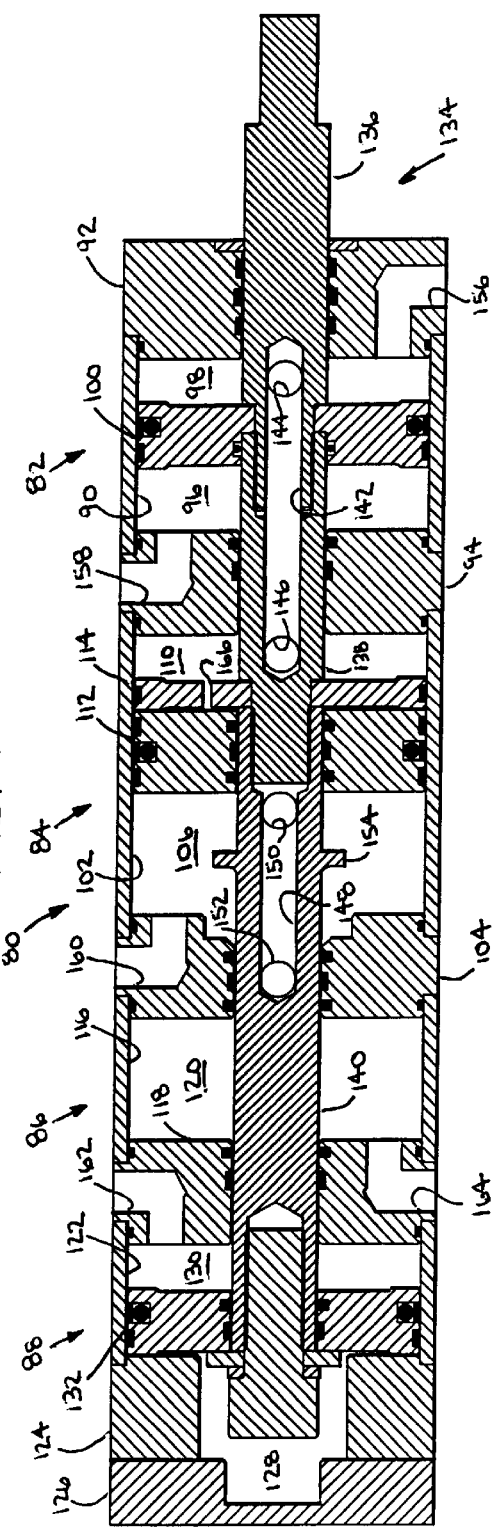
FIGS. 5 and 6 are view similar to FIG. 4 with certain components of the drive unit shown in different positions.

To retract the cylinder as shown in FIG. 5, regulated fluid pressure is applied through the port 162 to the piston 132, forcing it against the end block 124. When the piston rod 134 is pulled by the piston 132 to a fixed retracted position, the port 146 is no longer inside of the first separator 94 during the return stroke. However, the reduction in the stroke length reduces the piston momentum, making the reduction in soft-touch acceptable.

Various modifications of the above-described embodiments of the invention will be apparent to those skilled in the art, and it is to be understood that such modifications can be made without departing from the scope of the invention, if they are within the spirit and the tenor of the accompanying claims.

We claim:

1. A soft-touch pneumatic drive unit comprising first cylindrical wall means, a first end block closing off an end of said cylindrical wall means, a first separator block closing off another end of said first cylindrical wall means, second cylindrical wall means, said first separator block closing off an end of said second cylindrical wall means, a second separator block closing off another end of said second cylindrical wall means, third cylindrical wall means, said second separator block closing off an end of said third cylindrical wall means, a second end block closing off another end of said third cylindrical wall means, piston rod means extending through said first end block, said first separator block, and said second separator block, a floating piston movable within said second cylindrical wall means on said piston rod means, a first piston affixed on said piston rod means within said second cylindrical wall means on the side of said floating piston toward said second separator block, a second piston affixed on said piston rod means within said third cylindrical wall means, said piston rod means having a first passage with a first port located within said second cylindrical wall means, and having a second port located toward said first cylindrical wall means from said first port, said piston rod means having a second passage with a third port located on the side of said first piston toward said third cylindrical wall means and having a fourth port on the side of said second piston opposite said second cylindrical wall means, means for supplying cushioning fluid through said first separator block, means for supplying return fluid through said first separator block, and means for supplying advance and welding fluid under pressure through said second end block.

2. A pneumatic drive unit according to claim 1 characterized by said first piston having a by-pass port therein for enabling the flow of fluid from one side of said first piston to the other.

3. A pneumatic drive unit according to claim 1 characterized by said piston rod means having a positive stop thereon to limit the movement of said floating piston in one direction, with said floating piston closing off said first port of said first piston rod means when engaging said positive stop.

4. A pneumatic drive unit according to claim 1 characterized by said third port being within said second separator block when said first piston is in a retracted position against said second separator block.

5. A pneumatic drive unit according to claim 1 characterized by means for venting fluid through said second separator block.

6. A soft-touch pneumatic drive unit comprising wall means forming a cushioning chamber, an additional chamber, and a drive chamber, piston rod means extending substantially through said chambers, a first piston on said piston rod means in said additional chamber, a second piston on said piston rod means in said drive chamber, a positive stop on said piston rod means in said additional chamber, a floating piston on said piston rod means in said additional chamber between said first piston and said positive stop, a first passage in said piston rod means having a first port located toward said cushioning chamber from said positive stop, said first passage having a second port located toward said drive chamber from said positive stop, a second passage in said piston rod means having a third port located toward said additional chamber from said second piston, said second passage having a fourth port located away from said additional chamber from said second piston, means for supplying cushioning fluid to said cushioning chamber, means for supplying return fluid to said additional chamber, means for supplying advance fluid to said drive chamber on the side of said second piston away from said additional chamber, and means for venting fluid from said drive chamber on the side of said second piston toward said additional chamber.

7. A pneumatic drive unit according to claim 6 wherein said first piston has a by-pass port therein for passing fluid from one side of the first piston to the other side.

8. A pneumatic drive unit comprising wall means forming a cushioning chamber and an additional chamber, piston rod means extending substantially through said chambers, a drive piston on said piston rod means in said additional chamber, a positive stop on said piston rod means in said additional chamber, a floating piston on said piston rod means in said additional chamber between said drive piston and said positive stop, a passage in said piston rod means having a first port located toward said cushioning chamber from said positive stop, said passage having a second port located on the side of said positive stop opposite said cushioning chamber, means for supplying cushioning fluid to said cushioning chamber, means for supplying return fluid to said additional chamber on the side of said floating piston toward said cushioning chamber, and means for supplying advance fluid to said additional chamber on the side of said drive piston opposite said cushioning chamber.

9. A pneumatic drive unit according to claim 8 wherein said return fluid supplying means is effective to vent fluid from said additional chamber on the side of said floating piston toward said cushioning chamber.

10. A pneumatic drive unit according to claim 8 wherein said drive piston has a by-pass port therein for passing fluid from one side of said drive piston to the other side.

11. A pneumatic drive unit according to claim 8 wherein said piston rod means has a second passage with a third port located on the side of said drive piston away from said cushioning chamber and a fourth port located on the side of said third port away from said cushioning chamber.

* * * * *